Patented Oct. 11, 1949

2,484,420

UNITED STATES PATENT OFFICE 2,484,420

PROCESS OF PREPARING QUATERNIZED SALTS OF RESINOUS ORGANIC POLYMERS CONTAINING A BASIC TERTIARY NITROGEN ATOM

Louis M. Minsk and William O. Kenyon, Rochester, N. Y., assignors to Eastman Kodak Company, Rochester, N. Y., a corporation of New Jersey No Drawing. Application December 31, 1946, Serial No. 719,626

8 Claims. (Cl. 260—88.3)

This invention relates to a process for the preparation of quaternary salts of resinous linear addition-type organic polymers which contain a basic tertiary nitrogen atom comprising heating the polymer with an alkyl sulfate or an alkyl arylsulfonate in a solvent of the group consisting of alcohols, ethers, alcohol-ethers and ketones.

Monomeric quaternary ammonium salts can be prepared in mass by simply heating a mixture of the tertiary nitrogen compound with the desired alkyl halide. Such monomeric quaternary salts can be purified by the usual methods of washing, recrystallization, etc. However, in the case of resinous organic polymers the attempt to purify their quaternary salt derivatives meets with considerable difficulties. It is not possible as a rule to obtain pure polymeric compounds by the simple process of reaction in mass followed by the ordinary methods of purification.

We have now found that by controlling the step of quaternization of the resinous polymers, products of much higher, uniform purity are obtainable. This marked improvement we accomplish in our invention by carrying out the quaternization in an inert liquid, which at the same time is a solvent for the components entering into the quaternizing reaction, the quaternary salt product being obtained in solid form by precipitating the reaction medium into a liquid which is non-solvent for the salt, filtering out the salt and washing it with a non-solvent liquid. Our new proceess is advantageously adaptable to large scale production. Also the quaternary salt products prepared by our new process have less color, more homogeneity and higher compound purity than the same salt products made in mass without the benefit of an inert liquid reaction solvent medium.

In the practice of our invention, we prefer to use as the inert liquid reaction solvent medium, a neutral oxygen containing organic compound which is a solvent for the initial starting components. While solvents such as methyl alcohol, absolute ethyl alcohol, isopropyl alcohol, butyl alcohol, the monoethyl ether of ethylene glycol, the monomethyl ether of ethylene glycol, the monoethyl ether of diethylene-glycol, ethyl lactate, β-hydroxyethyl acetate, 1,4-dioxane, the formal of ethylene glycol, methyl ethyl ketone, methyl isopropyl ketone, formamide, ethyl cyanoacetate, nitromethane, nitrobenzene, can all be used successfully, we have found that the best results are obtained with those solvents having only carbon, hydrogen and oxygen atoms in their chemical compositions, and more particularly 1,4-dioxane and the monomethyl ether of ethylene glycol. The latter are similar in being solvents for the initial reacting components, but dissimilar in their solvent actions on the quaternary salt products. In the case of 1,4-dioxane, it is a non-solvent for the quaternary salts, so that the product settles out of the reaction mixture as it is formed, whereas the monomethyl ether of ethylene glycol is a solvent for both the initial reacting components and the quaternary salt products, from which the quaternary salt must be isolated by precipitation of the reaction solution into a non-solvent for the polymer, for example, 2-vinylpyridine polymer metho-p-toluenesulfonate formed in the monomethyl ether of ethylene glycol was precipitated by pouring the mixture into butyl acetate. Other non-solvents for the quaternized salts of our invention include ethers, acid esters of higher alcohols and higher ketones, for example, ethyl ether, amyl acetate, methyl isobutyl ketone.

The alkyl sulfates and alkyl arylsulfonates which can advantageously be used as quaternizing reagents in the process of our invention include arylsulfonates of the benzene series, for example, methyl p-toluenesulfonate, n-butyl p-toluenesulfonate, isobutyl p-toluenesulfonate, methyl benzenesulfonate, ethyl benzenesulfonate, n-propyl benzenesulfonate, n-butyl benzenesulfonate, isobutyl benzenesulfonate, or dialkyl sulfates, for example, dimethyl sulfate, diethyl sulfate, di-n-propyl sulfate, di-n-butyl sulfate or diisobutyl sulfate. Other alkyl sulfates and alkyl arylsulfonates which can also be used in our process are, for example, n-amyl p-toluenesulfonate, isoamyl p-toluenesulfonate, n-hexyl p-toluenesulfonate, isohexyl p-toluenesulfonate, n-heptyl p-toluenesulfonate, n-octyl p-toluenesulfonate, n-nonyl p-toluenesulfonate, n-decyl p-toluenesulfonate, n-lauryl p-toluenesulfonate, n-amyl benzenesulfonate, isoamyl benzenesulfonate, n-hexyl benzenesulfonate, isohexyl benzenesulfonate, n-heptyl benzenesulfonate, n-octyl benzenesulfonate, n-nonyl benzenesulfonate, n-decyl benzenesulfonate, n-lauryl benzenesulfonate, di-n-amyl sulfate, diisoamyl sulfate, di-n-hexyl sulfate, diisohexyl sulfate, di-n-heptyl sulfate, di-n-octyl sulfate, di-n-nonyl sulfate, di-n-decyl sulfate, or di-n-lauryl sulfate. The ratios in which the components in the quaternizing mixtures can be used in our process can vary quite widely from one to more than three molecular parts of the alkyl sulfate or alkyl arylsulfonate to one molecular part of the resinous polymer having the tertiary nitrogen to be quaternized. The temperature of the quaternization reaction mixture can also be varied over a considerable temperature range, depending upon the boiling point of the inert solvent medium, but preferably from 50° to 200° C. The quaternary salts produced by our process as described in the preceding and in the examples which follow are particularly valuable as precipitants and mordants of acid dyes, as well as being useful colloidizing agents.

It is, accordingly, an object of the invention to provide a process whereby quaternary salts of resinous linear addition-type organic polymers which contain a basic tertiary nitrogen atom can be obtained. Other objects will become apparent hereinafter.

The following examples will serve further to illustrate our invention.

*Example 1.—Poly-2-vinylpyridine ethoethylsulfate*

20 grams of poly-2-vinylpyridine were dissolved in 100 c. c. of dry 1,4-dioxane. To the clear tan colored dope obtained, there were added 40 grams of diethyl sulfate, and the mixture heated to reflux in an all-glass apparatus for about one hour. The quaternized polymer precipitated almost at once. The supernatant liquid was then poured off, and the cake remaining quickly extracted with 200 c. c. of 1,4-dioxane, followed by one quick wash with 250 c. c. of absolute ethyl alcohol. The cake was then dispersed by shaking with 250 c. c. of absolute ethyl alcohol. The dope obtained was filtered through paper by suction and precipitated in a large excess of ethyl ether. The granular precipitate was extracted with three 2-liter changes of fresh ether and dried in a vacuum desiccator under constant water pump vacuum. 30 grams of light tan colored friable product were obtained. This product was soluble in water and no precipitation was caused, when the water solution was made alkaline by addition of sodium hydroxide. The analysis gave a nitrogen and sulfur content of 6.47 and 11.51 per cent by weight, respectively, as compared with calculated of 5.41 and 12.37 per cent. This result indicates that more than 70 per cent of the nitrogen groups had been quaternized.

*Example 2.—Poly-2-vinylpyridine metho-p-toluenesulfonate*

200 grams of poly-2-vinylpyridine were dispersed in a shaker with 1600 c. c. of dry 1,4-dioxane. To the dope obtained, there were added 500 c. c. of methyl p-toluene sulfonate, and the mixture heated on a steam bath for about 16 hours in an all-glass apparatus equipped with a calcium chloride tube for protection against moisture from the atmosphere. The quaternized polymer precipitated from the solution in the form of a cake. The supernatant liquid was poured off and the cake dissolved in 4 liters of absolute ethyl alcohol. The resulting alcoholic dope solution was filtered through paper with the aid of suction, and the resin reprecipitated by pouring the filtrate in a fine stream into 20 gallons of ethyl ether under agitation by means of a large mixer. The precipitate was stirred for 20 minutes and filtered onto a Buchner funnel. The polymer was extracted with 2 gallons of fresh ethyl ether by stirring therein for one hour, filtered off once more, and re-dissolved in about 7 liters of absolute ethyl alcohol. The polymer was again reprecipitated in 20 gallons of ethyl ether, followed by three extractions with 2 gallon portions of fresh ether, the polymer being stirred for about one hour with each extraction, and finally extracted once with Skellysolve G, (essentially consisting of low boiling hydrocarbons). After filtering off, the polymer was dried in a vacuum desiccator under constant vacuum, protected from atmospheric moisture by a calcium chloride tube, followed by drying in an open dish at normal atmospheric pressure, at 55° C. for 2 hours. The yield was 460 grams. The analysis gave a value for nitrogen content of 4.95 per cent by weight, and sulphur content of 10.64 per cent, as compared to calculated theoretical of 4.81 per cent and 11.01 per cent, respectively. This result indicates that substantially all of the nitrogen groups had been quaternized.

*Example 3.—Poly-2-vinylpyridine metho-p-toluenesulfonate*

100 grams of poly-2-vinylpyridine were dispersed in one liter of 1,4-dioxane, 240 grams of methyl p-toluene sulfonate added, and the mixture heated for a period of 16 hours on a steam bath in an all-glass apparatus equipped with a calcium chloride tube for protection against moisture from the atmosphere. The polymer began to precipitate after 10 minutes of heating. At the end of the heating period the mixture was cooled and the supernatant liquid decanted off. One liter of absolute ethyl alcohol was added and the mixture shaken until the cake had completely dissolved. The ethyl alcohol dope was then poured in a fine stream into 75 pounds of butyl acetate and vigorously agitated by a large mechanical stirrer. After 30 minutes of stirring, the product was filtered onto a Buchner funnel, stirred with two 15 pound portions of fresh butyl acetate, each with one hour of stirring followed by filtration onto a Buchner funnel. The product was dried at 60° C. on a tray. A good yield of high purity 2-vinylpyridine polymer metho-p-toluenesulfonate was obtained.

*Example 4.—Poly-2-vinylpyridine metho-p-toluenesulfonate*

100 grams of poly-2-vinylpyridine were dispersed in 900 grams of methyl ethyl ketone, 240 grams of methyl p-toluene sulfonate added, and the mixture heated for a period of 16 hours on a steam bath in an all-glass apparatus. The quaternized polymer precipitated in the form of a white cake. The reaction mixture was cooled, the supernatant liquid poured off and the cake dissolved by shaking with 1200 c. c. of absolute ethyl alcohol. The product was reprecipitated by pouring the alcohol solution into 5 gallons of butyl acetate with vigorous stirring. The precipitated product was filtered off, washed with two 2 gallon portions of fresh butyl acetate, each with one hour of stirring followed by filtration onto a filtering funnel, washed on the funnel with two 2 liter portions of fresh butyl acetate and dried at 60° C., on a tray. Analysis of the product gave a nitrogen and sulfur content of 6.0 and 9.0 per cent, respectively, as compared to calculated theoretical of 4.81 and 11.01 per cent.

*Example 5.—Poly-2-vinylquinoline metho-p-toluenesulfonate*

1 gram of poly-2-vinylquinoline was dispersed in 10 c. c. of 1,4-dioxane. To the dope obtained, there were added 2 c. c. of methyl p-toluene sulfonate. The reaction mixture was heated for 18 hours on a steam bath in an all-glass reflux apparatus, protected from atmospheric moisture by means of a calcium chloride tube. The polymer precipitated from the solution. The reaction mixture was cooled, the supernatant liquid poured off, and the solid dissolved in 10 c. c. of absolute ethyl alcohol. The dope obtained was brown in color, and after filtering, it was precipitated in 200 c. c. of ethyl ether. The granular precipitate was filtered off, washed with fresh portions of ether and dried in a vacuum desiccator under constant vacuum, protected from moisture by a calcium chloride tube. The yield was 1 gram. Analysis of this product gave 4.59 per cent by weight of nitrogen and 7.57 per cent by weight of sulfur, as compared to calculated theoretical of 4.10 per cent and 9.40 per cent, respectively. This result indicates that about 80 per cent of the nitrogen groups had been quaternized.

*Example 6.—Poly-2-vinylpyridine metho-p-toluenesulfonate*

10 grams of poly-2-vinylpyridine were dispersed in 50 c. c. of nitromethane and 25 c. c. of methyl-p-toluene sulfonate added. The reaction mixture was heated on a steam bath for three hours in an all glass reflux apparatus, protected from atmospheric moisture by means of a calcium chloride tube. The resulting clear tan dope was diluted with 50 c. c. of nitromethane and precipitated in ethyl ether. The soft precipitate obtained was extracted with fresh ether, redissolved in absolute ethyl alcohol and reprecipitated in Skellysolve G. The latter reprecipitate was then extracted with two one-liter portions of Skellysolve (consisting essentially of aliphatic hydrocarbons boiling at 50°-70°) and dried in a vacuum desiccator under constant water pump vacuum, protected from atmospheric moisture by a calcium chloride tube. The yield of product was 16.5 grams. Analysis of this product gave 4.78 per cent by weight of nitrogen and 11.25 per cent by weight of sulfur, as compared to calculated theoretical of 4.81 per cent and 11.01 per cent, respectively. This result indicates that product was substantially pure 2-vinylpyridine polymer metho-p-toluene sulfonate.

*Example 7.—Poly-2-vinylpyridine metho-p-toluenesulfonate*

20 grams of poly-2-vinylpyridine were dispersed in 200 c. c. of absolute ethyl alcohol. To this were added 50 c. c. of methyl p-toluene sulfonate. The mixture was then heated on a steam bath for 16 hours in an all-glass apparatus, protected from atmospheric moisture by a calcium chloride tube. The clear tan dope obtained was diluted with one liter of absolute ethyl alcohol and the resin precipitated by pouring the solution in a fine stream into four liters of ethyl ether, accompanied with vigorous stirring. The precipitate was given three extractions with two liter portions of ethyl ether, followed by two extractions with Skellysolve G (consisting essentially of aliphatic hydrocarbons boiling at 50°-70°). The product was dried in a vacuum desiccator under constant vacuum, protected by a calcium chloride tube, and finally in an oven for 3 hours at 50° C. The yield was 52 grams, or equivalent to about 93 per cent of theoretical.

*Example 8.—Poly-2-vinylpyridine metho-p-toluenesulfonate*

100 grams of poly-2-vinylpyridine were dispersed by shaking in 1000 c. c. of the monomethyl-ether of ethylene glycol. To this dope, there were added 190 grams of methyl p-toluene sulfonate, and the reaction mixture heated for 16 hours on a steam bath in an all-glass reflux apparatus, protected from atmospheric moisture by a calcium chloride tube. A clear dark tan colored dope was obtained. The dope was poured in a fine stream into three gallons of butyl acetate and the precipitation mixture vigorously agitated. The suspension was stirred for 20 minutes, after which the suspended product was filtered onto a Buchner funnel. The product was stirred for 30 minutes with fresh butyl acetate, again filtered onto a Buchner funnel, washed on the funnel with one-half gallon of fresh butyl acetate, removed from the funnel and dried on a tray at 50°-60° C. The yield was very nearly quantitative. Analysis gave 4.67 per cent by weight of nitrogen and 10.94 per cent by weight of sulfur, as compared with the calculated theoretical of 4.81 per cent and 11.01 per cent, respectively.

*Example 9.—Poly-4-vinylpyridine metho-p-toluenesulfonate*

25 grams of poly-4-vinylpyridine were dispersed in 330 c. c. of the monomethyl ether of ethylene glycol. To the dope, there were added 60 grams of methyl p-toluene sulfonate, and the reaction mixture heated for 16 hours on a steam bath in an all-glass reflux apparatus, equipped with a calcium chloride tube for protection against atmospheric moisture. The resulting clear tan colored dope was diluted to 800 c. c. with monomethyl ether of ethylene glycol and divided into two unequal portions. The larger portion was precipitated in a large excess of butyl acetate and the precipitate obtained then extracted with fresh portions of butyl acetate. The product was dried at 60° C. in an air oven. The yield was 58.5 grams. The smaller portion of the dope was precipitated in methyl isobutyl ketone, and the precipitate purified by extraction with fresh portions of the same solvent. The product was then dried in an air oven at 60° C. The yield was 9 grams. Analysis for nitrogen and sulfur on the former sample were 11.07 per cent and 4.42 per cent, respectively; on the latter 4.54 per cent and 11.43 per cent, respectively.

*Example 10.—Poly-2-vinylpyridine metho-p-toluene sulfonate*

A solution composed of 104 grams of monomeric 2-vinylpyridine, freshly distilled in a vacuum, 250 c. c. of absolute ethyl alcohol and 200 grams of methyl p-toluene sulfonate was heated to reflux in an all-glass apparatus for a period of two and one-half hours. The resulting dope upon standing at room temperature, changed to a very viscous, reddish-brown, clear dope, which was completely soluble in water. The product was 2-vinylpyridine polymer metho-p-toluene sulfonate.

*Example 11.—Poly-4-vinylpyridine metho-p-toluenesulfonate*

A mixture of 10.5 grams of 4-vinylpyridine monomer, 18.6 grams of methyl p-toluene sulfonate and 50 c.c. of nitrobenzene was heated in an oil bath at 190° C., for a period of about 30 minutes. The brown solution obtained was diluted with water and the nitrobenzene removed by steam distillation. The solution was decolorized by boiling with Norite (a decolorizing charcoal) for 10 minutes, filtered and concentrated to 400 c.c. under reduced pressure. The product was poly-4-vinylpyridine polymer metho-p-toluene sulfonate. In place of methyl p-toluene sulfonate in the above example, there can be substituted an equivalent amount of ethyl p-toluene sulfonate, n-propyl p-toluene sulfonate, n-butyl p-toluene sulfonate, isobutyl p-toluene sulfonate, methyl benzene sulfonate, ethyl benzene sulfonate, n-propyl benzene sulfonate, n-butyl benzene sulfonate, or isobutyl benzene sulfonate to obtain the corresponding 4-vinylpyridine polymer alko-p-arylsulfonates.

In similar manner there can be prepared the corresponding quaternary salts of 2-vinylpyridine polymer.

*Example 12.—Poly - β - diethylaminoethyl α-methacrylate metho-p-toluenesulfonate*

15 g. of poly - β - diethylaminoethyl α - methacrylate were dispersed, by shaking, in 150 cc. of dry 1,4-dioxane. To the dope obtained were added 37.5 c.c. of methyl p-toluenesulfonate, and the mixture was heated for 16 hours on a steam bath in an all-glass reflux outfit, protected from atmospheric moisture by a calcium chloride tube. Within 5 minutes of heating, separation of the quaternary salt of the polymer began and after the 16-hour heating period, the quaternary salt of the polymer had precipitated out as a soft cake. The reaction mixture was cooled, the supernatant liquid poured off, and the cake was dissolved in 20° cc. of absolute ethyl alcohol. After filtering the resulting dope through paper by suction, the dope was poured, in a fine stream, into 3 liters of diethyl ether and the whole was vigorously agitated. The precipitated quaternary salt of the polymer was removed from the ether and again extracted with a fresh portion of diethyl ether. The quaternary salt of the polymer was then dissolved in 250 cc. of absolute ethyl alcohol and again precipitated by pouring the ethyl alcoholic dope into 3 liters of diethyl ether. For further purification, the quaternary salt of the polymer was given 2 additional extractions, each of one hour with stirring, with one liter portions of fresh diethyl ether, and then 2 extractions, each of 10 minutes with stirring, with ¾ of a liter of a mixture of hydrocarbons (consisting essentially of aliphatic hydrocarbons boiling at 50 to 70° C.). The quaternary salt of the polymer was then dried in a vacuum desiccator under constant water pump vacuum, protected from moisture by a calcium chloride tube. Analysis: nitrogen found 3.51%, calculated 3.77%; sulfur found 8.29%, calculated 8.63%.

*Example 13.—Metho-p-toluenesulfonate of the copolymer of β-diethylamino-ethyl α-methacrylate and α-methacrylic acid*

A copolymer was prepared by mixing 100 g. of α-methacrylic anhydride, 400 c.c. of 1,4-dioxane and 300 mg. of benzoyl peroxide, and heating the mixture on a steam bath for 2 hours, then adding 200 g. of β-diethylaminoethyl alcohol, and heating for 16 additional hours. At the end of this time a little water was added and the cool reaction mixture was poured into acetone to precipitate the copolymer. The precipitated copolymer was stirred with several fresh portions of acetone and finally dried in vacuo. 10 g. of the copolymer were dispersed at 90° C. in 100 cc. of ethylene glycol in an all-glass reflux apparatus, protected from atmospheric moisture by a calcium chloride tube. To the resulting dope were added 10 cc. of methyl-p-toluenesulfonate and the resulting mixture was heated at 90° C. for 16 hours. The resulting dope was diluted with absolute ethyl alcohol and the diluted dope poured into ethyl acetate to precipitate the quaternary salt. The gummy precipitate was redissolved in ethyl alcohol and the quarternary salt again precipitated by pouring the ethyl alcoholic solution into diethyl ether. The quaternary salt (now in the form of a granular product) was given 3 extractions with 1-liter portions of fresh diethyl ether, each for 1 hour, followed by 2 extractions with 1 liter portions of a hydrocarbon mixture (essentially aliphatic hydrocarbons boiling between 50 and 70° C.), each for ½ hour. The quaternary salt was then dried in a vacuum desiccator under constant water pump vacuum, protected from moisture by a calcium chloride tube. Analysis: nitrogen found 3.14%, calculated 3.06%; sulfur found 6.19%, calculated 7.0%.

*Example 14.—Poly-2-vinylpyridine metho-p-toluenesulfonate*

20 g. of poly-2-vinylpyridine were dispersed, by shaking, in 200 g. of glycol formal (Delephine, Comp. rend. 131, 745 (1900)). To the dispersion were added 48 g. of methyl p-toluenesulfonate and the mixture was heated on a steam bath in an all-glass reflux apparatus for 16 hours. At the end of this time, the metho-p-toluenesulfonate had precipitated as a tan cake. The supernatant liquid was poured off and replaced with 200 cc. of absolute ethyl alcohol. Upon shaking, a smooth dope was obtained. This was diluted with an additional 200 cc. of absolute ethyl alcohol and then poured, in a fine stream, into 3 liters of n-butyl acetate with stirring. The precipitated quaternary salt was extracted with 3 liters of fresh n-butyl acetate, with stirring, for 30 minutes, filtered off and again extracted with 1 liter of fresh n-butyl acetate. The quaternary salt was then dried at 55° C. Yield 42 g. Analysis: nitrogen found 4.9%; sulfur found 10.8%.

*Example 15.—Metho-p-toluenesulfonate of copolymer of 2-vinyl-pyridine and styrene*

50 g. of a 2-vinylpyridine-styrene copolymer, containing 25% (by weight) of styrene, were dispersed in 500 g. of 1,4-dioxane. When solution was complete, 90 g. of methyl-p-toluenesulfonate were added, and the mixture was heated for 16 hours on a steam bath in an all-glass reflux apparatus, protected from atmospheric moisture by a calcium chloride tube. The quaternary salt precipitated out as a cake. The supernatant liquid was poured off, and 500 cc. of absolute ethyl alcohol were added. The mixture was then shaken until a smooth dope was obtained. The quaternary salt was precipitated by pouring the dope (diluted to 1200 cc. with absolute ethyl alcohol), in a fine stream, into an excess of n-butyl acetate, with stirring. The precipitated quaternary salt was extracted with four 2-liter portions of fresh n-butyl acetate, with 1.5 hours soaking for each extraction. The quaternary salt was filtered from the n-butyl acetate and dried at 60° C. in an air oven. The yield was 46 g. Analysis: nitrogen found 3.8%; sulfur found 8.0%.

What we claim is:

1. A process for preparing resinous poly-2-vinylpyridine metho-p-toluenesulfonate comprising heating resinous poly-2-vinylpyridine with methyl p-toluenesulfonate in solution in 1,4-dioxane.

2. A process for preparing resinous poly-2-vinylpyridine metho-p-toluenesulfonate comprising heating resinous poly-2-vinylpyridine with methyl p-toluenesulfonate in solution in monomethyl ether of ethylene glycol.

3. A process for quaternizing a resinous polyvinylpyridine selected from those wherein the vinyl group is attached to a carbon atom of the pyridine nucleus comprising heating the polyvinylpyridine with a compound selected from the group consisting of dialkyl sulfates and alkyl arylsulfonates, in solution in a neutral organic compound selected from the group consisting of saturated monohydric aliphatic alcohols, saturated aliphatic ethers, saturated aliphatic ketones and 1,4-dioxane.

4. A process for quaternizing resinous poly-2-vinylpyridine comprising heating the poly-2-vinylpyridine with an alkyl arylsulfonate in solution in a neutral organic compound selected from the group consisting of saturated monohydric aliphatic alcohols, saturated aliphatic ethers, saturated aliphatic ketones 1,4-dioxane.

5. A process for quaternizing resinous poly-4-vinylpyridine comprising heating the poly-4-vinylpyridine with an alkyl arylsulfonate, in solution in a neutral organic compound selected from the group consisting of saturated monohydric aliphatic alcohols, saturated aliphatic ethers, saturated aliphatic ketones and 1,4-dioxane.

6. A process for quaternizing resinous poly-2-vinylpyridine comprising heating the poly-2-vinylpyridine with methyl p-toluensoufonate, in solution in a monoalkyl ether of ethylene glycol containing from 3 to 4 carbon atoms.

7. A process for quaternizing resinous poly-4-vinylpyridine comprising heating the poly-4-vinylpyridine with methyl p-toluensoulfonate, in solution in a monoalkyl ether of ethylene glycol containing from 3 to 4 carbon atoms.

8. A process for preparing poly-4-vinylpyridine metho-p-toluenesulfonate comprising heating poly-4-vinylpyridine with methyl p-toluenesulfonate, in solution in monomethyl ether of ethylene glycol.

LOUIS M. MINSK.
WILLIAM O. KENYON.

REFERENCES CITED

The following references are of record in the file of this patent:

UNITED STATES PATENTS

| Number | Name | Date |
|---|---|---|
| 2,138,763 | Graves | Nov. 29, 1938 |
| 2,138,762 | Graves | Nov. 29, 1938 |

FOREIGN PATENTS

| Number | Country | Date |
|---|---|---|
| 849,126 | France | Aug. 7, 1939 |

OTHER REFERENCES

Shriner and Fuson, "The Systematic Identification of Organic Compounds," 2nd ed., Wiley, New York, 1940, pages 148–149.